United States Patent
Kawase et al.

(10) Patent No.: US 8,120,339 B2
(45) Date of Patent: Feb. 21, 2012

(54) SWITCHING POWER SUPPLY WITH SWITCHING CIRCUITS

(75) Inventors: Yoshiyuki Kawase, Nagoya (JP); Toru Itabashi, Anjo (JP); Mitsuhiro Kanayama, Takahama (JP)

(73) Assignee: DENSO Corporation, Kariya (JP)

( * ) Notice: Subject to any disclaimer, the term of this patent is extended or adjusted under 35 U.S.C. 154(b) by 445 days.

(21) Appl. No.: 12/360,219

(22) Filed: Jan. 27, 2009

(65) Prior Publication Data
US 2009/0189583 A1 Jul. 30, 2009

(30) Foreign Application Priority Data

Jan. 28, 2008 (JP) .................................. 2008-016401

(51) Int. Cl.
*G05F 1/40* (2006.01)

(52) U.S. Cl. ........................................ 323/272; 323/285

(58) Field of Classification Search .................. 323/271, 323/272, 282, 284, 285, 351; 363/65
See application file for complete search history.

(56) References Cited

U.S. PATENT DOCUMENTS

| | | | |
|---|---|---|---|
| 4,912,621 A | 3/1990 | Kobayashi et al. | |
| 6,084,790 A * | 7/2000 | Wong | 363/71 |
| 6,424,129 B1 * | 7/2002 | Lethellier | 323/272 |
| 6,433,321 B1 * | 8/2002 | Lee et al. | 219/715 |
| 6,674,274 B2 * | 1/2004 | Hobrecht et al. | 323/285 |
| 7,071,660 B2 * | 7/2006 | Xu et al. | 323/266 |
| 2006/0291260 A1 | 12/2006 | Nakashima | |

FOREIGN PATENT DOCUMENTS

| | | |
|---|---|---|
| JP | 01-222659 | 9/1989 |
| JP | 11-150951 | 6/1999 |
| JP | 2002-291247 | 10/2002 |
| JP | 2006-115637 | 4/2006 |
| JP | 2007-006669 | 1/2007 |

OTHER PUBLICATIONS

Japanese Office Action dated Oct. 6, 2009, issued in corresponding Japanese Application No. 2008-016401, with English translation.

* cited by examiner

*Primary Examiner* — Jessica Han
(74) *Attorney, Agent, or Firm* — Nixon & Vanderhye P.C.

(57) ABSTRACT

A switching power supply has first and second switching units and a control unit. Each switching unit has a switching element performing a switching operation to intermittently receive electric current from a battery while accumulating electric power in a coil and discharging this power to an output terminal. A resistor earthed is serially connected with each switching element. The resistance of the first resistor receiving the first current from the first switching element is lower than that of the second resistor receiving the second current from the second switching element. A maximum value of the first current is higher than that of the second current due to the difference between the resistors. The control unit controls the switching operations of the elements to boost the voltage of the battery and stops the switching operations in response to the first current exceeding an upper value.

12 Claims, 6 Drawing Sheets

SWITCHING POWER SUPPLY WITH SWITCHING CIRCUITS

CROSS-REFERENCE TO RELATED APPLICATION

This application is based upon and claims the benefit of priority of the prior Japanese Patent Application 2008-16401 filed on Jan. 28, 2008, so that the contents of which are incorporated herein by reference.

BACKGROUND OF THE INVENTION

1. Field of the Invention

The present invention relates generally to a switching power supply wherein a plurality of switching circuits connected parallel to one another perform respective switching operations to convert a power supply voltage into a controlled voltage.

2. Description of Related Art

An electronic control unit (ECU) of a vehicle has a switching power supply which boosts a power supply voltage of a battery. Therefore, even when the voltage of the battery is lowered due to cranking in the vehicle, the ECU can be normally operated while receiving a controlled voltage higher than the battery voltage from the switching power supply. The ECU performs many types of operations, and the number of operations has been recently increased. Therefore, the size of the ECU is also increased, and the operating current consumed in the ECU has been increased. To smoothly operate the ECU, it is required to increase the quantity of current supplied from the switching power supply.

To supply a large quantity of current to an ECU, a multi-phase DC/DC converter type switching power supply has been disclosed in Published Japanese Patent First Publication No. 2007-6669. In this power supply, a plurality of switching circuits corresponding to phases are connected parallel to one another, an input voltage of a battery is boosted in each switching circuit, and boosted voltages are applied to a single current supply line. Therefore, an electric current set at a controlled voltage higher than the battery voltage can be supplied from the line to an ECU.

However, to protect the switching circuits, it is required to detect an over-current flowing through each switching circuit in an over-current detector and to limit the current of the switching circuit in a current limiter. Therefore, each switching circuit needs one over-current detector and one current limiter As a result, the manufacturing cost and size of the switching power supply are undesirably increased.

SUMMARY OF THE INVENTION

An object of the present invention is to provide, with due consideration to the drawbacks of the conventional switching power supply, a switching power supply, having a plurality of switching circuits connected parallel to one another, which is manufactured in a small size and in a low cost while reliably preventing an over-current from flowing through any of the switching circuits.

According to a first aspect of this invention, the object is achieved by the provision of a switching power supply comprising a first switching unit, a second switching unit and an output terminal. The first switching unit receives an input voltage from an external power source and performs a first switching operation to intermittently receive a first electric current from the external power source and to produce a first voltage, different from the input voltage, from the input voltage and the first electric current. The second switching unit receives the input voltage from the external power source and performs a second switching operation to intermittently receive a second electric current from the external power source and to produce a second voltage, different from the input voltage, from the input voltage and the second electric current. A maximum value of the first electric current is higher than a maximum value of the second electric current. The output terminal receives the first voltage of the first switching unit and the second voltage of the second switching unit, and an output voltage obtained by combining the first and second voltages is outputted through the output terminal.

With this structure of the switching power supply, because of the maximum value of the first electric current higher than the maximum value of the second electric current, even when the second electric current is not detected, the power supply can recognize that the second electric current is lower than the first electric current. Therefore, when limiting the first and second electric currents in response to the first electric current reaching an upper current limit, the power supply can reliably prevent an over-current from flowing through any of the switching units, without detecting the second electric current in a current detector.

Accordingly, a switching power supply with the over-current preventing performance can be manufactured in a small size and in a low cost while simplifying the structure of the power supply.

Preferably, the power supply further comprises a current detector which detects the first electric current without detecting the second electric current, and a switching control unit which controls the first and second switching operations of the first and second switching units in response to the first electric current detected by the current detector to prevent any of the first and second electric currents from exceeding an upper current limit.

With this structure, the power supply can reliably prevent any of the first and second electric currents from exceeding the upper current limit, without detecting the second electric current.

DETAILED DESCRIPTION OF THE PREFERRED EMBODIMENTS

Embodiments of the present invention will now be described with reference to the accompanying drawings, in which like reference numerals indicate like parts, members or elements throughout the specification unless otherwise indicated.

First Embodiment

Figure 1:
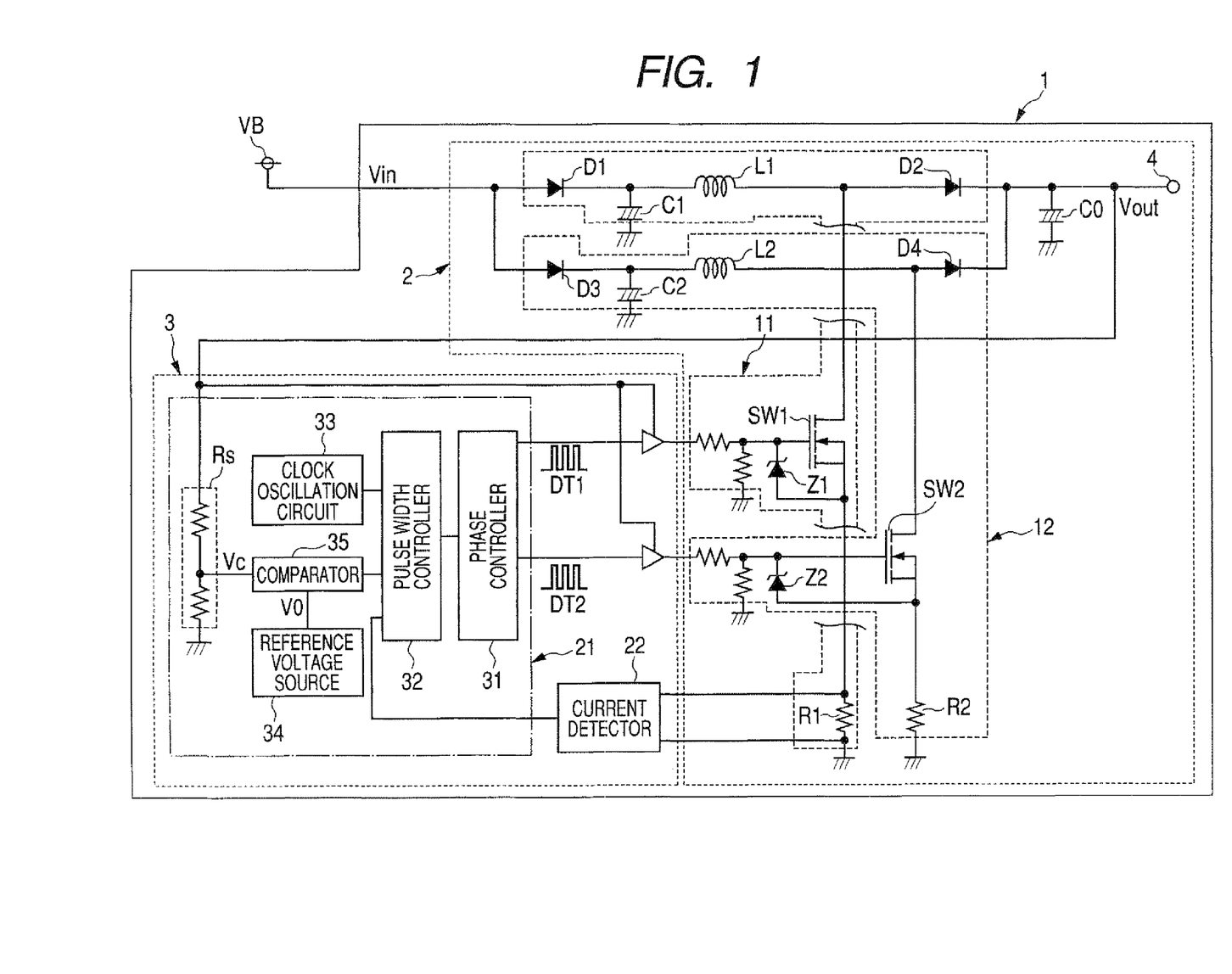
FIG. 1 is a circuit view of a switching power supply according to the first to fourth embodiments of the present invention.

FIG. 1 is a circuit view of a switching power supply according to the first to fourth embodiments.

As shown in FIG. 1, a switching power supply 1 disposed in an electronic control unit (ECU) of a vehicle has a voltage boosting unit 2 and a control unit 3. The boosting unit 2 receives an input voltage Vin of a direct current from a battery VB such as an external electric power source, boosts this voltage Vin to an output voltage Vout and outputs the voltage Vout. The input voltage Vin is changeable in response to cranking or cranking return. The control unit 3 controls the boosting unit 2 to outputs the voltage Vout adjusted at a target value (e.g., 8V) even when the input voltage Vin is dropped or returned to a normal value.

The boosting unit 2 has two switching circuits 11 and 12 connected parallel to each other, a capacitor C0 having both a first terminal connected with a common point of the circuits 11 and 12 and a second terminal earthed, and an output terminal 4 connected with the first terminal of the capacitor C0.

The circuit 11 receives the input voltage Vin from the battery VB and performs a first switching operation to intermittently receive a first electric current changing with time from the battery VB and to produce a first boosted voltage from the input voltage Vin and the first electric current. The first boosted voltage changes with time and is higher than the input voltage Vin.

The circuit 12 receives the input voltage Vin from the battery VB and performs a second switching operation to intermittently receive a second electric current changing with time from the battery VB and to produce a second boosted voltage from the input voltage Vin and the second electric current. The second boosted voltage changes with time and is higher than the input voltage Vin.

As described later in detail, the circuits 11 and 12 are structured such that a maximum value of the first electric current becomes higher than a maximum value of the second electric current (first and second embodiments), or the control unit 3 controls the circuits 11 and 12 during the boost operation such that a maximum value of the first electric current becomes higher than a maximum value of the second electric current (third and fourth embodiments).

The capacitor C0 smoothes an electric current obtained by combining currents of the first and second boosted voltages to produce a current of the voltage Vout. The current of the voltage Vout is accumulated in the capacitor C0 or is outputted from the terminal 4.

The switching circuit 11 has a diode D1 preventing a current of the circuit 11 from being returned to the battery VB, a diode D2 preventing a current from being returned from the capacitor C0 or the terminal 4 to the circuit 11, a coil L1 having both one terminal connected with the battery VB through the diode D1 and another terminal connected with the terminal 4 through the diode D2, a current detecting resistor R1 representing a resistive element, a first switching element SW1 formed of an n-channel type MOSFET (metal oxide semiconductor field effect transistor) having the drain connected with a connection between the coil L1 and the diode D2 and the source earthed through the resistor R1, a Zener diode Z1 having the anode connected with the source of the element SW1 and the cathode connected with the gate of the element SW1 to prevent an over-current from flowing through the element SW1, and an input capacitor C1 having one terminal connected with the battery VB through the diode D1 and another earthed terminal to smooth a current flowing through the coil L1.

In the same manner as the switching circuit 11, the switching circuit 12 has a diode D3 preventing a current of the circuit 11 from being returned to the battery VB, a diode D4 preventing a current from being returned from the capacitor C0 or the terminal 4 to the circuit 12, a coil L2 having both one terminal connected with the battery VB through the diode D3 and another terminal connected with the terminal 4 through the diode D4, a current limiting resistor R2 representing a resistive element, a second switching element SW2 formed of an n-channel type MOSFET having the drain connected with a connection between the coil L2 and the diode D4 and the source earthed through the resistor R2, a Zener diode Z2 having the anode connected with the source of the element SW2 and the cathode connected with the gate of the element SW2 to prevent an over-current from flowing through the element SW2, and an input capacitor C2 having one terminal connected with the battery VB through the diode D3 and another earthed terminal to smooth a current flowing through the coil L2.

During the switching operation in each of the elements SW1 and SW2, the differential voltage between the drain and source is increased with the drain current. The elements SW1 and SW2 have substantially the same output characteristics (i.e., the relation between the drain current and the differential voltage) when receiving the same gate voltage. The resistance value of the resistor R1 is set to be lower than the resistance value of the resistor R2 (first and second embodiments). For example, the resistor R1 is set at $0.1\Omega$, and the resistor R2 is set at $0.2\Omega$.

With this structure of the boosting unit 2, when the switching elements SW1 and SW2 are set in the off state together without performing any switching operation, the input voltage Vin of the battery VB is applied to the terminal 4 through the diodes D1 to D4 and the coils L1 and L2. That is, the voltage at the terminal 4 is equal to the voltage of the battery VB. When at least one of the switching elements SW1 and SW2 performs the switching operation under control of the control unit 3, the voltage of the battery VB is boosted in the boosting unit 2, and the voltage at the terminal 4 exceeds the voltage of the battery VB. More specifically, each time the switching element SW1 is turned on, a first electric current Isw1 is supplied from the battery VB and flows through the coil L1, the element SW1 and the resistor R1 while accumulating electric power in the coil L1. Then, when the element SW1 is turned off to rapidly stop the flow of the current Isw1, the voltage of the electric power accumulated in the coil L1 is promptly heightened, and the electric power is discharged to the terminal 4 through the diode D2 to apply a boosted voltage higher than the input voltage Vin to the terminal 4. Therefore, the electric power of the coil L1 heightens the voltage at the terminal 4. In the same manner, each time the switching element SW2 is turned on and off, electric power is accumulated in the coil L2 and is discharged to the terminal 4 through the diode D4 to heighten the voltage at the terminal 4.

Accordingly, the voltage Vout at the terminal 4 can become higher than the input voltage Vin of the battery VB, in response to the switching operation of at least one of the switching elements SW1 and SW2.

The first electronic circuit composed of the coil L1 and the capacitor C1 and the second electronic circuit composed of the coil L2 and the capacitor C2 are designed as follows. Because of the difference between the resistance values of the resistors R1 and R2, assuming that the drain currents of the elements SW1 and SW2 are the same, the drain voltage of the element SW2 becomes higher than the drain voltage of the element SW1. In other words, when the elements SW1 and SW2 receive the same drain voltage, the drain current of the element SW1 becomes higher than the drain current of the element SW2 in a current ratio. The first and second electronic circuits are designed such that the output voltage of the coil L1 becomes substantially the same as the output voltage of the coil L2 when the first current IL1 flowing through the coil L1 and the second current IL2 flowing through the coil L2 satisfy the current ratio (IL1>IL2). That is, when the currents of the coils L1 and L2 satisfy the current ratio, the voltages applied to the drains of the elements SW1 and SW2 become substantially the same, and the currents flowing through the elements SW1 and SW2 satisfy the current ratio.

The control unit 3 has both a switching control unit 21 and a current detector 22. The detector 22 detects only a switching current Isw1 flowing through the drain and source of the first switching element SW1 from a differential voltage between ends of the resistor R1. The detector 22 outputs a signal indicating the detected current Isw1 to the unit 21. The control unit 21 controls the first and second switching operations of the switching elements SW1 and SW2 in response to the output voltage Vout so as to maintain the output voltage Vout to a predetermined value. Further, the control unit 21 stops the first switching operation of the switching element SW1 in response to the switching current Isw1 detected by the detector 22 to prevent the first switching current Isw1 flowing through the element SW1 from exceeding an upper current limit.

The control unit 21 has a phase controller 31 for producing a first duty signal DT1 set at a first duty ratio and a second duty signal DT2 set at a second duty ratio, outputting the first duty signal DT1 to the gate of the switching element SW1 to control the switching operation of the element SW1, and outputting the second duty signal DT2 to the gate of the switching element SW2 to control the switching operation of the element SW2. Each of the duty signals has pulses set at the same on-pulse width at equal intervals to be alternately set at a high level and a low level. The duty ratio of each duty signal is indicated by the ratio of the high level period to a sum of the high and low level periods. The duty signals DT1 and DT2 have substantially the same pulse cycle or frequency. The high levels of the duty signals are substantially set at the same value, so that the controller 31 applies substantially the same gate voltage to the elements SW1 and SW2.

The switching element receiving one duty signal is turned on in response to the leading edge of each pulse of the duty signal and is turned off in response to the trailing edge of each pulse of the duty signal. Therefore, each switching element performs the switching operation in response to the duty signal, and the element has a constant on-state period and a constant off-state period alternately repeated. The on-state ratio of the switching operation is defined as the ratio of the on-state period to the sum of the on-state period and the off-state period. Therefore, the on-state ratio in each switching element is equal to the duty ratio of the duty signal for the element.

The control unit 21 further has a reference voltage source 34 for generating a reference voltage V0, for example, set at 1.25V, a series of voltage dividing resistors Rs for producing a divided voltage Vc proportional to the output voltage Vout, a comparator 35 for comparing the divided voltage Vc with the reference voltage V0, producing a boost requesting signal indicating the difference between the voltages Vc and V0 when the voltage Vc is lower than the voltage V0 and producing a boost stopping request when the output voltage Vout indicated by the voltage Vc is increased to a boost stop value Vth, a clock oscillation circuit 33 for generating a reference clock signal set at a predetermined frequency, and a pulse width controller 32 for determining a first on-pulse width of the duty signal DT1 and a second on-pulse width of the duty signal DT2 according to the boost requesting signal of the comparator 35 to maintain the output voltage Vout to a predetermined value, and controlling the phase controller 31, during the boost operation, to produce the duty signals DT1 and DT2 set at the on-pulse widths and to set a start timing of each pulse of each duty signal according to the reference clock signal.

During the current limiting process performed after or during the boost operation, the controller 32 controls the phase controller 31, in response to the signal of the detector 22, to set the on-pulse width of each duty signal at the zero value (first and third embodiments), to shorten the on-pulse width of each duty signal (second embodiment), to set the on-pulse width of the second duty signal DT2 at the zero value while resetting the on-pulse width of the second duty signal DT2, previously set at the zero value, at a predetermined value (fourth embodiment).

Figure 2:
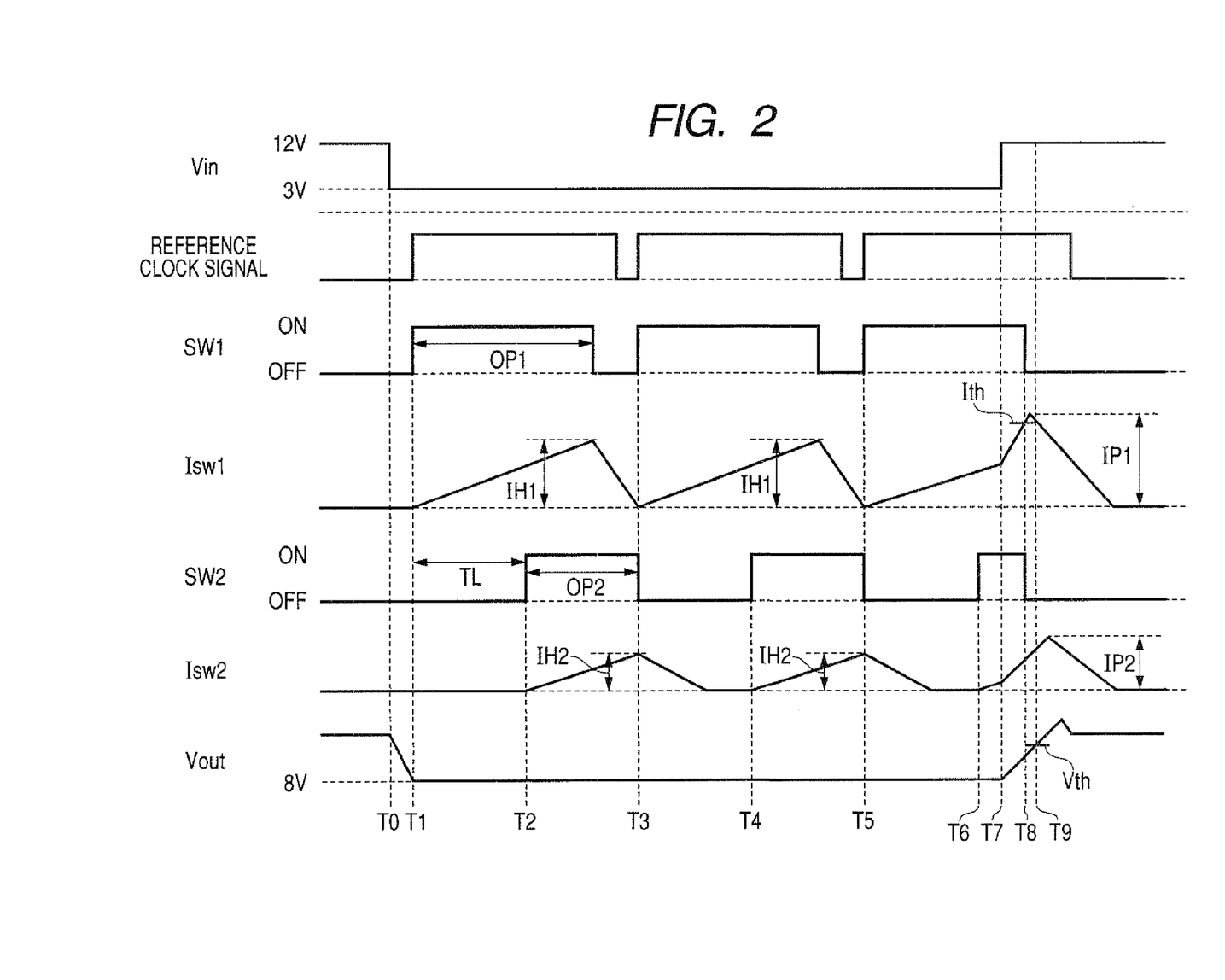
FIG. 2 is a timing chart showing both a boost operation and a current limiting process of the power supply shown in FIG. 1 according to the first embodiment of the present invention.

With this structure of the switching power supply 1, the boost operation of the power supply 1 will be initially described with reference to FIG. 2. FIG. 2 is a timing chart showing both the boost operation and a current limiting process of the power supply 1 according to the first embodiment.

As shown in FIG. 2, when a large volume of electric power accumulated in the battery VB is suddenly consumed in an electric motor (not shown) or the like due to cranking or the like, the input voltage Vin applied to the power supply 1 by the battery VB is suddenly dropped, and the output voltage Vout is rapidly lowered. When the input voltage Vin having a normal voltage value (e.g., 12V) is reduced to a lower voltage value (e.g., 3V), the voltage Vout is lowered and reaches a boost start value (e.g., 8V). In response to the voltage Vout reaching the boost start value, the voltage Vc of the resistors Rs becomes lower than the voltage V0 of the source 34, the comparator 35 outputs a boost requesting signal to the controller 32, and the boost operation of the controllers 31 and 32 is started. This boost requesting signal indicates the difference between the voltages Vc and V0.

In this operation, to maintain the voltage Vout to the boost start value, the controller 32 adjusts a first on-pulse width OP1 and a second on-pulse width OP2 according to the boost requesting signal. Then, the controller 32 controls the controller 31 to produce the first duty signal DT1 having pulses set at the first on-pulse width OP1 and to produce the second duty signal DT2 having pulses set at the second on-pulse width OP2. The second on-pulse width OP2 is, for example, set to be shorter than the first on-pulse width OP1.

When the input voltage Vin is dropped to the lower voltage value at the time T0, the decrease of the output voltage Vout is started at the time T0, and the voltage Vout reaches the boost start value at the time T1. In response to the voltage Vout reaching the boost start value, the controller 32 controls the controller 31 such that pulses of the first duty signal DT1 set at the high level are started, for example, at the times T1, T2 and T3 in synchronization with the leading edges of pulses of the reference clock signal. In contrast, pulses of the second duty signal DT2 set at the high level are started at the times T2, T4 and T6 which are, for example, delayed by a predetermined time TL from the respective times T1, T2 and T3, and the two pulses of the signal DT2 are, for example, ended at the times T3 and T5. Each pulse of the duty signal DT2 overlaps with one pulse of the duty signal DT1 with respect to the time axis, and at least one of the duty signals DT1 and DT2 is set at the high level during the boost operation.

The controller 31 outputs the signals DT1 and DT2 to the gates of the switching elements SW1 and SW2, respectively. The element SW1 performs the first switching (or on-off)

operation in response to the signal DT1, and the element SW2 performs the second switching operation in response to the signal DT2.

More specifically, the switching element SW1 is set in the on state during the on-state period OP1 in response to the high level of each pulse of the duty signal DT1, and the switching current Isw1 of the element SW1 is increased substantially at a first current increase rate and reaches a peak value (i.e., maximum value) IH1 at the time corresponding to the trailing edge of the pulse. This current increase rate depends on the resistance value of the resistor R1. Then, in response to the low level of the duty signal DT1, the switching element SW1 is set in the off states and the switching current Isw1 is rapidly decreased to the zero value.

In the same manner, the switching element SW2 is set in the on state during the on-state period OP2 in response to the high level of each pulse of the duty signal DT2, and the switching current Isw2 of the element SW2 is increased at a second current increase rate and reaches a peak value (i.e., maximum value) IH2 at the time corresponding to the trailing edge of the pulse. This current increase rate depends on the resistance value of the resistor R2. Then, in response to the low level of the duty signal DT2, the switching element SW2 is set in the off state, and the switching current Isw2 is rapidly decreased to the zero value.

The increase and decrease of each of the currents Isw1 and Isw2 are repeated during the boost operation. Therefore, in the boosting unit 2, the input voltage Vin is boosted to the output voltage Vout, and the output voltage Vout is maintained to the boost start value.

As the on-pulse width of a duty signal is lengthened, the on-state period OP1 (or OP2) in the switching element receiving the duty signal is lengthened, and the peak value of the switching current flowing through the switching element is heightened. Because the resistance value of the resistor R2 is set to be higher than the resistance value of the resistor R1, the current increase rate of the switching current Isw2 is smaller than the current increase rate of the switching current Isw1. Further, the on-state period OP2 of the switching element SW2 is not longer than the on-state period OP1 of the switching element SW1. Therefore, the peak value IH2 of the current Isw2 in the element SW2 is necessarily lower than the peak value IH1 of the current Isw1 in the element SW1.

Figure 3:
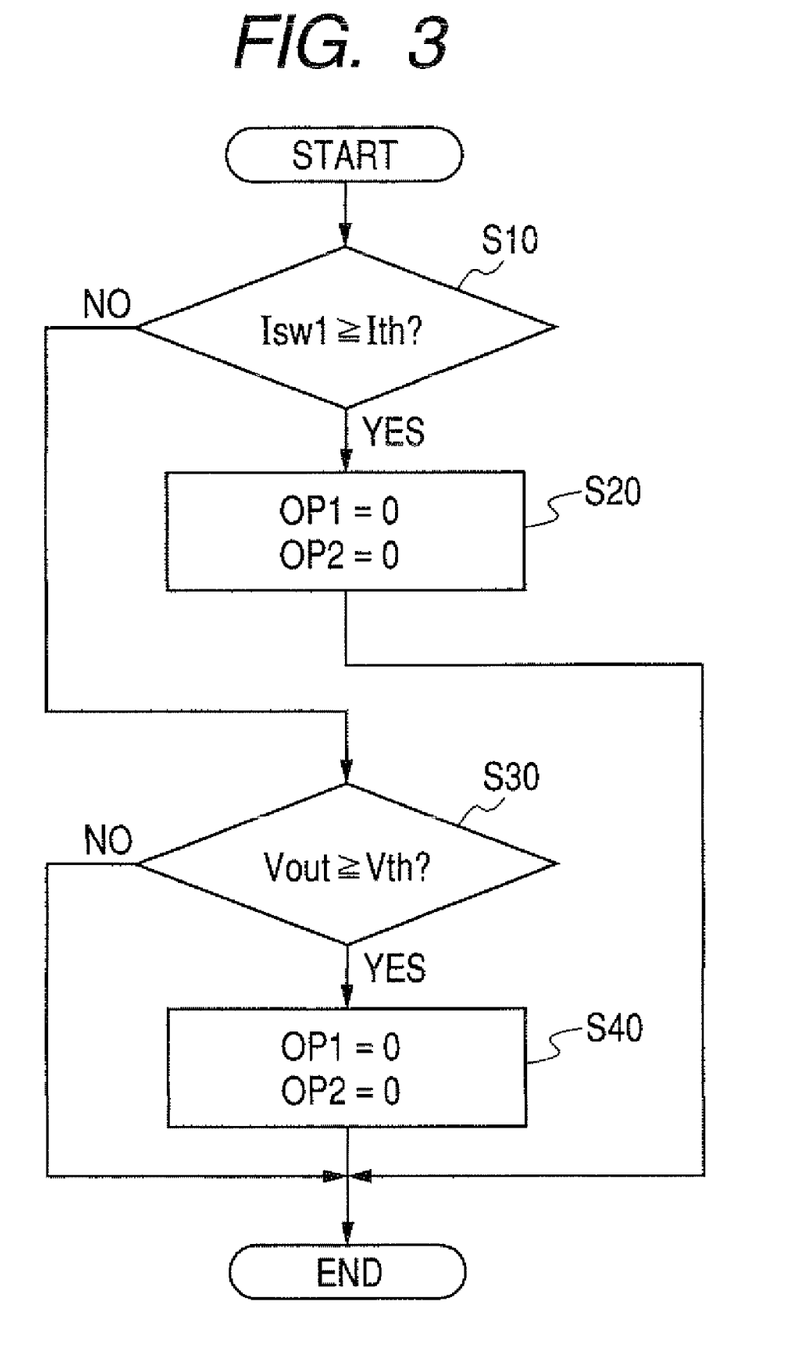
FIG. 3 is a flow chart showing the current limiting process according to the first embodiment.

Further, the current limiting process is performed after the boost operation in the controllers 31 and 32 in response to the signal of the current detector 22. This process will be described with reference to FIG. 2 and FIG. 3. FIG. 3 is a flow chart showing the procedure of the current limiting process according to the first embodiment. This procedure is performed every repetition cycle during the current limiting process.

As shown in FIG. 3, at step S10, the controller 32 judges whether or not the switching current Isw1 detected in the detector 22 is equal to or higher than an upper current limit Ith. This limit Ith is set to be higher than the peak value IH1. During cranking, the current Isw1 is sufficiently lower than the limit Ith, so that the negative judgment of the controller 32 is obtained at step S10. Then, at step S30, the controller 32 judges according to the signal of the comparator 35 whether or not the output voltage Vout is equal to or higher than a boost stop value Vth. During the cranking, the voltage Vout is sufficiently lower than the value Vth, so that the negative judgment of the controller 32 is obtained at step S30. This process is once ended and is restarted.

When the consumption of electric power of the battery VB in the electric motor or the like is stopped due to the cranking return or the like, the input voltage Vin is heightened and returned to the normal value (e.g., 12V) at the time T7, and current consumers (not shown) start operations while receiving electric current from the battery VB through the power supply 1. Therefore, a large current temporarily flows from the battery VB to the current consumers through the coils L1 and L2 of the power supply 1. In response to this temporarily-increased current, electric currents Isw1 and Isw2 flowing through the switching elements SW1 and SW2 are rapidly increased after the time T7, and the output voltage Vout is increased after the time T7 in response to the rapidly-increased currents Isw1 and Isw2.

When the current Isw1 of the element SW1 higher than the current Isw2 exceeds the peak values IH1 and reaches the limit Ith higher than the value IH1 at the time T8, the detector 22 detects the current Isw1 being equal to or higher than the limit Ith. In response to this detection of the detector 22, the affirmative judgment of the controller 32 is obtained at step S10. Then, at step S20, the controller 32 sets each of the on-pulse widths OP1 and OP2 of the duty signals DT1 and DT2 at the zero value at the time T8. Then, this process is completed. That is, the controller 31 stops applying the gate voltage to the gates of the elements SW1 and SW2 at the time T8, so that the switching operations of the elements SW1 and SW2 are stopped. Therefore, the currents Isw1 and Isw2 are decreased after the time T8 and reach the zero value. For example, the current Isw1 reaches a maximum value IP1 higher than the peak value IH1 and is decreased. The current Isw2 reaches a maximum value IP2 higher than the peak value IH2 and is decreased. The value IP2 is lower than the value IP1.

In this example of the switching current Isw1 and the voltage Vout, before the voltage Vout reaches the value Vth at the time T9, the current Isw1 reaches the limit Ith. Therefore, the controller 32 performs no affirmative judgment at step S30. However, when the voltage Vout reaches the value Vth before the current Isw1 reaches the limit Ith, the affirmative judgment of the controller 32 is obtained at step S30 after the negative judgment of the controller 32 at step S10. Then, at step S40, the controller 32 sets each of the on-pulse widths OP1 and OP2 of the duty signals DT1 and DT2 at the zero value to stop the switching operations of the elements SW1 and SW2. Therefore, the currents Isw1 and Isw2 are decreased and reach the zero value.

As is described above, the resistance of the resistor R2 is set to be larger than the resistance of the resistor R1, so that the current Isw2 flowing through the element SW2 is necessarily lower than the current Isw1 flowing through the element SW1. That is, when the switching current Isw1 of the element SW1 reaches the limit Ith, the switching current Isw2 of the element SW2 is necessarily lower than the limit Ith. Therefore, in this embodiment, although the control unit 3 detects only the current Isw1 without detecting the current Isw2, the controller 32 can ascertain or recognize that the switching current Isw2 is necessarily lower than the limit Ith even when the switching current Isw1 reaches the limit Ith.

Accordingly, although the switching current Isw2 is not detected, the switching power supply 1 can reliably prevent the over-current caused in the elements SW1 and SW2. That is, the switching power supply 1 can reliably prevent the elements SW1 and SW2 from being damaged or broken due to the over-current.

Further, because the power supply 1 has no constitutional element for detecting the current Isw2 of the element SW2, the structure of the power supply 1 can be simplified. That is, a small-sized power supply can be manufactured at a low cost.

In this embodiment, the second on-pulse width OP2 of the second duty signal DT2 is set to be shorter than the first on-pulse width OP1 of the first duty signal DT1. However, because of the resistance of the resistor R2 larger than that of the resistor R1, the increase rate of the current Isw2 flowing through the switching element SW2 is lower than the increase rate of the current Isw1 flowing through the switching element SW1. That is, even when the widths OP1 and OP2 are the same as each other, the current Isw2 is necessarily lower than the current Isw1. Therefore, the widths OP1 and OP2 may be set at the same value.

Further, in this embodiment, the leading edge of each pulse of the duty signal DT2 is delayed by the predetermined time TL from the leading edge of the corresponding pulse of the duty signal DT1. However, the timing of the leading edge in each pulse of the duty signal DT2 may be the same as the timing of the leading or trailing edge in one pulse of the duty signal DT1.

Moreover, in this embodiment, the power supply 1 has two switching circuits 11 and 12. However, the power supply 1 may have three switching circuits or more. In this case, a resistor is serially connected with the source of each switching element, and the resistance of the specific resistor serially connected with the source of the specific switching element is set to be smallest among resistances of the resistors. The current detector 22 detects only the current flowing through the specific resistor as the drain current of the specific switching element.

Furthermore, in this embodiment, each switching element is formed of the n-channel type MOSFET. However, at least one of the elements may be formed of a p-channel type MOSFET.

Second Embodiment

There is a case where the input voltage Vin lowered to the lower voltage value (e.g., 3V) is gradually heightened to the normal voltage value (e.g., 12V). In this case, the current Isw1 of the switching element SW1 is gradually increased to a current limiting value and reaches the upper current limit Ith higher than the current limiting value. In this case, when the current Isw1 reaches the current limiting value lower than the limit Ith, it is preferable that the on-state period in each of the elements SW1 and SW2 be shortened for a short time, before being set at zero value, to slightly reduce the currents Isw1 and Isw2.

In this embodiment, only this current limiting process differs from that according to the first embodiment.

Figure 4:
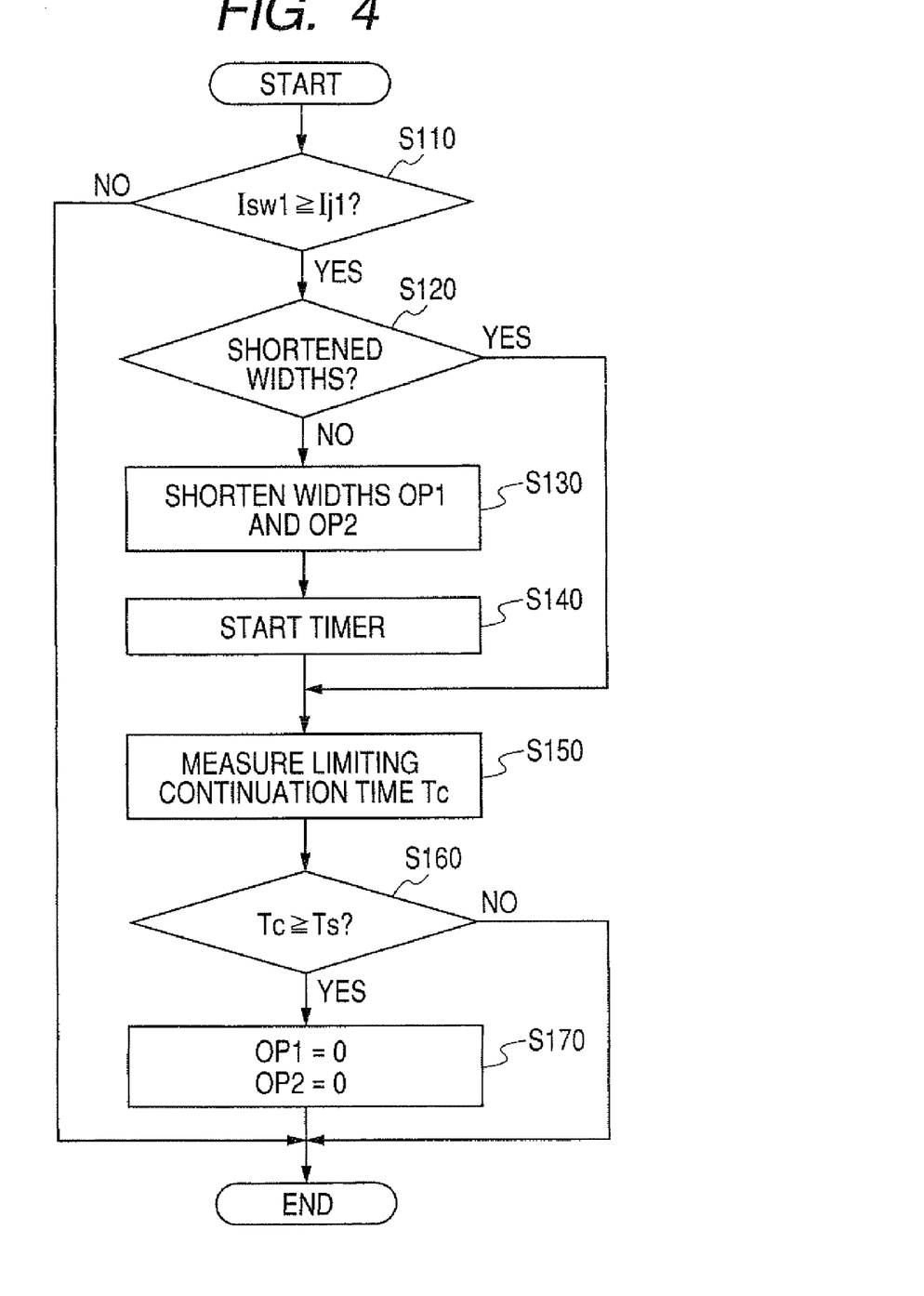
FIG. 4 is a flow chart showing the current limiting process according to the second embodiment of the present invention.

FIG. 4 is a flow chart showing the current limiting process according to the second embodiment.

As shown in FIG. 4, at step S110, the controller 32 judges whether or not the switching current Isw1 detected in the detector 22 is equal to or higher than a current limit judging value Ij1 (e.g. 3A). The value Ij1 is set to be higher than the peak value IH1 of the current Isw1. The value Ij1 is, for example, set to be lower than the limit Ith shown in FIG. 3. In case of the negative judgment, this current limiting process is once ended. In contrast, when the current ISW1 becomes equal to or higher than the value Ij1, the controller 32 recognizes that at least the element SW1 is set in a higher current state. Therefore, at step S120, the controller 32 judges whether or not the on-pulse widths OP1 and OP2 of the duty signals DT1 and DT2 have been already shortened to shorter values to reduce the currents Isw1 and Isw2. When none of the widths OP1 and OP2 are shortened, the controller 32 shortens the widths OP1 and OP2 from normal values to respective shorter values (step S130). Therefore, the currents Isw1 and Isw2 are limited. Then, at step S140, the controller 32 starts a timer. Then, at step S150, the controller 32 measures a limiting continuation time Tc denoting an elapsed time from the start of the timer. In contrast, at step S120, when the widths OP1 and OP2 have been already shortened, the controller 32 measures the limiting continuation time Tc at step S150.

Thereafter, at step S160, the controller 32 judges whether or not the limiting continuation time Tc is equal to or longer than a current stopping time Ts. In case of the negative judgment, the controller 32 recognized that the higher current states of the elements SW1 and SW2 are still allowed. Therefore, this current limiting process is once ended. In contrast, at step S160, when the limiting continuation time Tc is equal to or longer than the current stopping time Ts, the controller 32 recognized that the higher current states of the elements SW1 and SW2 should be ended. Therefore, at step S170, the controller 32 sets each of the on-pulse widths OP1 and OP2 at the zero value to stop the switching operations of the elements SW1 and SW2. Therefore, the currents Tsw1 and Isw2 of the elements SW1 and SW2 are reduced to the zero value together. Then, this process is ended.

As described above, when the current Isw1 of the switching element SW1 becomes equal to or higher than the value Ij1, the on-pulse widths OP1 and OP2 of the duty signals DT1 and DT2 are shortened. Thereafter, when the current Isw1 becomes lower than the value Ij1 due to the shortening of the on-pulse width, each of the switching elements SW1 and SW2 performs the switching operation at the shortened on-pulse width. This shortened switching operation is allowed for a short time. When the shortened switching operation of the switching element SW1 has been continued for the current stopping time Ts, each of the on-pulse widths OP1 and OP2 is set at the zero value, and the switching operations of the elements SW1 and SW2 are stopped Therefore, the currents Isw1 and Isw2 of the elements SW1 and SW2 are reduced to the zero value together.

Accordingly, because the currents Isw1 and Isw2 of the switching elements SW1 and SW2 are reduced when reaching the value Ij1, the elements SW1 and SW2 can be protected from higher currents flowing through the elements SW1 and SW2.

Further, because none of the on-pulse widths OP1 and OP2 are immediately set to zero in response to the current Isw1 reaching the value Ij1, the switching operations of the elements SW1 and SW2 can be still continued. Accordingly, the switching power supply 1 can stably boost the input voltage Vin to the output voltage Vout.

Moreover, because the on-pulse widths OP1 and OP2 are set at the zero value together in response to the continuation of the current Isw1 reaching the value Ij1, the controller 32 can prevent the over-current from flowing through any of the elements SW1 and SW2 for a long time. Accordingly, the switching power supply 1 can prevent the elements SW1 and SW2 from being damaged or broken due to the over-current.

In this embodiment, the value Ij1 is set to be lower than the limit Ith. However, when each of the elements SW1 and SW2 can withstand the current of the limit Ith continued for the current stopping time Ts, the value Ij1 may be equal to the limit Ith.

Further, in this embodiment, when the current Isw1 of the element SW1 operated at the shortened on-pulse width is lower than the value Ij1, each of the switching elements SW1 and SW2 continues the switching operation, regardless of an elapse of the current stopping time Ts. However, regardless of the current Isw1, the switching operations of the switching elements SW1 and SW2 at the shortened on-pulse width may be stopped in response to an elapse of the current stopping time Ts.

Third Embodiment

In the first embodiment, the resistance value of the resistor R2 is set to be higher than the resistance is value of the resistor R1, so that the current Isw2 of the element SW2 reliably becomes lower than the current Isw1 of the element SW1.

In contrast, in the third embodiment, to reliably obtain the current Isw2 of the element SW2 lower than the current Isw1 of the element SW1, the controller 32 sets a first on-pulse width OP11 of the duty signal DT1 and a second on-pulse width OP12 of the duty signal DT2 such that the width OP12 is shorter than the width OP11. For example, the width OP12 is set to be half of the width OP11. Further, the resistance value of the resistor R2 is, for example, set to be substantially equal to the resistance value of the resistor R1. Moreover, for example, the controller 32 sets the duty signals DT1 and DT2 such that each pulse of the signal DT2 has the leading edge at the same timing as the leading edge of one pulse of the signal DT1.

Figure 5:
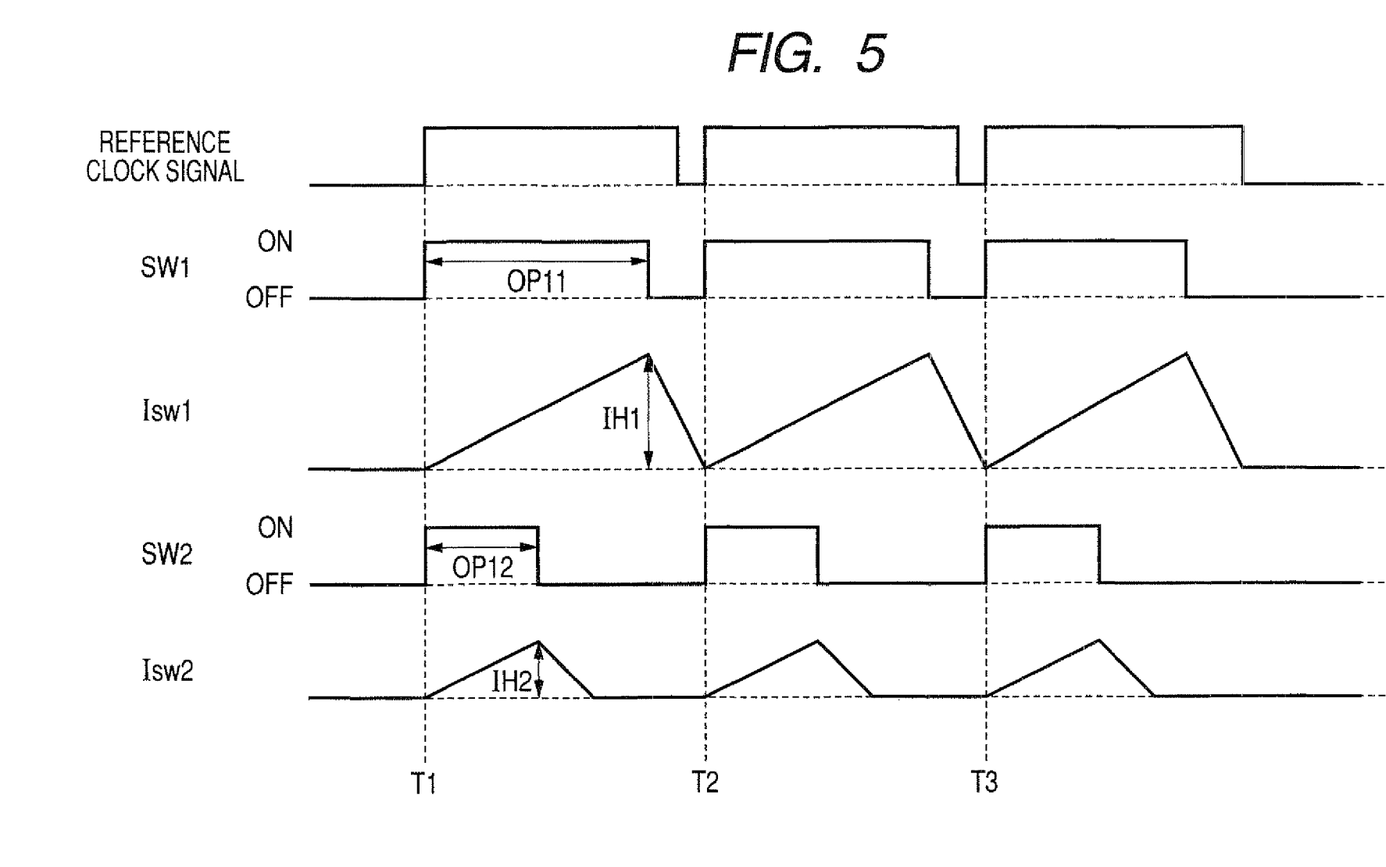
FIG. 5 is a timing chart showing a boost operation of the power supply shown in FIG. 1 according to the third embodiment of the present invention.

FIG. 5 is a timing chart showing a boost operation of the power supply shown in FIG. 1 according to the third embodiment.

As shown in FIG. 5, when the boost operation is started under control of the controllers 31 and 32 in response to the voltage Vout dropped to the boost start value, each of the duty signals DT1 and DT2 is set to the high level at the times T1, T2 and T3 in synchronization with leading edges of pulses of the reference clock signal. Each high level of the signal DT1 is continued for a first on-state period corresponding to the on-pulse width OP11 and is ended. Each high level of the signal DT2 is continued for a second on-state period corresponding to the on-pulse width OP12 and is ended before the end of the high level of the signal DT1.

During each on-state period OP11 of the duty signal DT1, the switching current Isw1 of the element SW1 is increased substantially at a current increase rate and reaches a peak value IH1. The current increase rate depends on the resistance value of the resistor R1. Then, the current Isw1 of the element SW1 is rapidly decreased to the zero value in response to the low level of the duty signal DT1. In the same manner, during each on-state period OP12 of the duty signal DT2, the switching current Isw2 of the element SW2 is increased at a current increase rate and reaches a peak value IH2. Then, the current Isw2 of the element SW2 is rapidly decreased to the zero value in response to the low level of the duty signal DT2.

Because the resistance value of the resistor R2 is substantially the same as the resistance value of the resistor R1, the current increase rate of the switching current Tsw2 is substantially equal to that of the switching current Isw1. However, because the on-pulse width OP12 is shorter than the on-pulse width OP11, the current increasing period in the element SW2 is shorter than the current increasing period in the element SW1. Therefore, the peak value IH2 of the current Isw2 in the element SW2 is necessarily lower than the peak value IH1 of the current Isw1 in the element SW1. For example, because the width OP12 is half of the width OP11, the peak value IH2 is half of the peak value IH1.

Thereafter, when the input voltage Vin is heightened to the normal voltage value (e.g., 12V), the current limiting process is performed in the same manner as in the first embodiment.

Accordingly, because the on-pulse width OP12 of the duty signal DT2 is set to be shorter than the on-pulse width OP11 of the duty signal DT1, the peak value IH2 of the current Isw2 of the element SW2 can be reliably set to be lower than the peak value IH1 of the current Isw1 of the element SW1. That is, although the switching current Isw2 is not detected, the switching power supply 1 can reliably prevent the over-current caused in the elements SW1 and SW2, so that the switching power supply 1 can reliably prevent the elements SW1 and SW2 from being damaged or broken due to the over-current.

Further, because the power supply 1 has no element for detecting the current Isw2 of the element SW2, the structure of the power supply 1 can be simplified. Accordingly, a small-sized switching power supply can be manufactured at a low cost.

In this embodiment, the resistance value of the resistor R2 is set to be the same as the resistance value of the resistor R1. However, in the same manner as in the first embodiment, the resistance value of the resistor R2 may be set to be higher than the resistance value of the resistor R1. Further, the resistance value of the resistor R2 may be set to be lower than the resistance value of the resistor R1. In this case, the ratio of the on-pulse width OP12 to the on-pulse width OP11 is adjusted such that the peak value IH2 of the switching current Isw2 is necessarily lower than the peak value IH1 of the switching current Isw1.

Further, in this embodiment, the timing of the leading edge in each pulse of the duty signal DT2 is the same as the timing of the leading edge in one pulse of the duty signal DT1. However, in the same manner as in the first embodiment, each pulse of the duty signal DT2 may have the leading edge which is delayed by a predetermined time from the leading edge in one pulse of the duty signal DT1.

Fourth Embodiment

There is a case where the input voltage Vin dropped due to the cranking or the like is higher than the lower voltage value (e.g., 3V). In this case, even when the second switching element SW2 is not operated, the output voltage Vout lowered with the voltage Vin can be sufficiently maintained to the boost start value (e.g., 8V) only by the switching operation of the first switching element SW1. Therefore, it is preferable that the switching operation of the second switching element SW2 be stopped during the boost operation when the output voltage Vout can be maintained to the boost start value only by the switching operation of the element SW1.

Figure 6:
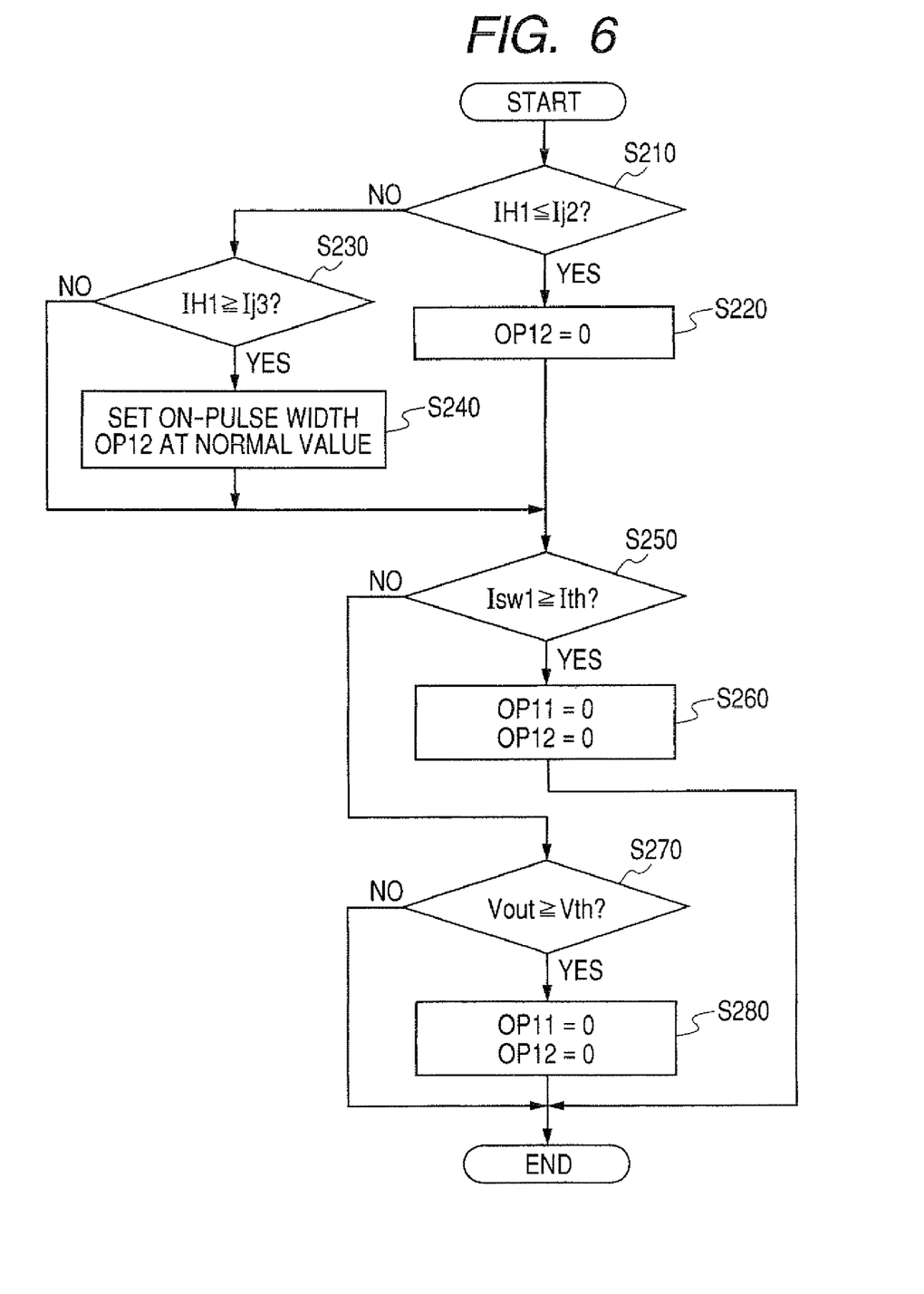
FIG. 6 is a flow chart showing the current limiting process performed during the boost operation according to the fourth embodiment of the present invention.

FIG. 6 is a flow chart showing the current limiting process performed during the boost operation according to the fourth embodiment. The current limiting process shown in FIG. 6 is always performed during the boost operation. When the boost operation is started, the ratio of the on-pulse width OP12 to the on-pulse width OP11 in the duty signals DT1 and DT2 is set at a normal on-pulse width value in the same manner as those in the third embodiment.

When the input voltage Vin is higher than the lower voltage value, the differential voltage between the input voltage Vin and the output voltage Vout maintained to the boost start value becomes lower than that in the third embodiment. Therefore, the on-state periods OP11 and OP12 are adjusted by the controller 32 to be shorter than those in the third embodiment, and the peak values IH1 and IH2 of the switching currents Isw1 and Isw2 in the elements SW1 and SW2 become lower than those in the third embodiment.

As shown in FIG. 6, during the boost operation, the controller 32 judges at step S210 whether or not the peak value IH1 of the switching current Isw1 detected by the detector 22 is equal to or lower than an operation stop judging value Ij2. The value Ij2 is set to be lower than the upper current limit Ith. The value Ij2 is, for example, set at 1.5 A. In case of the affirmative judgment, the controller 32 recognizes that the voltage Vin can be maintained to the boost start value (e.g., 8V) only by the switching operation of the first switching element SW1. Then, at step S220, the controller 32 sets the on-pulse width OP12 of the duty signal DT2 at the zero value, so that the switching operation of the switching element SW2 is stopped. Therefore, the controller 32 increases the on-state periods OP11 so as to heighten the peak value IH1 of the current Isw1, and the voltage Vin is maintained to the boost start value only by the switching operation of the switching element SW1. Thereafter, the procedure proceeds to step S250.

In contrast, when the peak value IH1 exceeds the value Ij2 at step S210, the controller 32 recognizes that it is not required to judge the necessity of the switching operation of the element SW2. Then, at step S230, the controller 32 judges whether or not the peak value IH1 is equal to or higher than an operation restart judging value Ij3. The value Ij3 is set to be lower than the upper current limit Ith and higher than the value Ij2. The value Ij3 is, for example, set at 2.0 A. In case of the affirmative judgment at step S230, the controller 32 recognizes that both the switching elements SW1 and SW2 should be operated to maintain the voltage Vin to the boost start value. Therefore, at step S240, when the on-pulse width OP12 of the duty signal DT2 has been already set at the zero value, the controller 32 cancels the zero setting of the on-pulse width OP12 and sets the on-pulse width OP12 at a normal value corresponding to the normal on-pulse width ratio of the widths OP11 and OP12. When the on-pulse width OP12 is not set at the zero value, the controller 32 continues the outputting of the widths OP11 and OP12 satisfying the normal on-pulse width ratio. Therefore, the switching operations of the switching elements SW1 and SW2 are performed, and the voltage Vin is maintained to the boost start value. Thereafter, the procedure proceeds to step S250.

In contrast, in case of the negative judgment at step S230, the controller 32 recognizes that the peak value IH1 is placed in an adequate range between the values Ij2 and IJ3. Therefore, it is not required to stop or restart the switching operation of the element SW2. Then, the procedure proceeds to step S250.

Thereafter, the controller 32 performs steps S250, S260, S270 and S280 in the same manner as steps S10 to S40 in the first embodiment, and this current limiting process is once ended.

In this current limiting process, because the switching operation of the element SW2 is stopped in response to the peak value IH1 equal to or lower than the value Ij2, the switching circuit 12 with the element SW2 is not frequently used as compared with the switching circuit 11 with the element SW1. Therefore, the switching circuit 12 can be used as an auxiliary member of the switching circuit 11. Accordingly, the size of the switching circuit 12 can be minimized.

In this embodiment, when the peak value IH1 of the switching current Isw1 flowing through the switching element SW1 is low, the on-pulse width OP12 of the duty signal DT2 is set at the zero value. However, this embodiment is not limited to the judgment based on the peak value IH1. For example, as the input voltage Vin is increased, the controller 32 decreases the on-pulse width OP11 corresponding to the duty ratio of the duty signal DT1. Therefore, when the duty ratio of the duty signal DT1 becomes equal to or lower than 80%, the on-pulse width OP12 of the duty signal DT2 may be set at the zero value.

In these embodiments, the switching power supply 1 boosts the input voltage Vin. However, the present invention can be applied for a switching power supply which decreases the input voltage Vin.

Further, the controller 32 is formed of a microcomputer with a central processing unit (CPU) a read only memory (ROM) and a random access memory (RAM). However, the controller 32 may be formed of a logic circuit.

What is claimed is:

1. A switching power supply, comprising:
a first switching unit which receives an input voltage from an external power source and performs a first switching operation to intermittently receive a first electric current from the external power source and to produce a first voltage, different from the input voltage, from the input voltage and the first electric current;
a second switching unit which receives the input voltage from the external power source and performs a second switching operation to intermittently receive a second electric current from the external power source and to produce a second voltage, different from the input voltage, from the input voltage and the second electric current; and
an output terminal which receives the first voltage of the first switching unit and the second voltage of the second switching unit and through which an output voltage obtained by combining the first and second voltages is outputted,
wherein a maximum value of the first electric current is higher than a maximum value of the second electric current;
wherein the first switching unit has a first resistive element which sets the first electric current received in the first switching unit, and the second switching unit has a second resistive element which sets the second electric current received in the second switching unit; and
wherein the first resistive element is a first resistor through which the first electric current flows, the second resistive element is a second resistor through which the second electric current flows, and a resistance of the second resistor is larger than a resistance of the first resistor to set the maximum value of the second electric current lower than the maximum value of the first electric current.

2. A switching power supply, comprising:
a first switching unit which receives an input voltage from an external power source and performs a first switching operation to intermittently receive a first electric current from the external power source and to produce a first voltage, different from the input voltage, from the input voltage and the first electric current;
a second switching unit which receives the input voltage from the external power source and performs a second switching operation to intermittently receive a second electric current from the external power source and to produce a second voltage, different from the input voltage, from the input voltage and the second electric current;
an output terminal which receives the first voltage of the first switching unit and the second voltage of the second switching unit and through which an output voltage obtained by combining the first and second voltages is outputted, wherein a maximum value of the first electric current is higher than a maximum value of the second electric current;
a current detector which detects the first electric current without detecting the second electric current; and
a switching control unit which controls the first and second switching operations of the first and second switching units in response to the first electric current detected by the current detector to prevent any of the first and second electric currents from exceeding an upper current limit.

3. The switching power supply according to claim 2, wherein the switching control unit stops the first and second switching operations of the first and second switching units in response to the first electric current reaching the upper current limit.

4. The switching power supply according to claim 2, wherein the switching control unit controls the first switching unit to receive the first electric current during a first on-state period, controls the second switching unit to receive the second electric current during a second on-state period, and shortens the first on-state period and the second on-state period in response to the first electric current reaching the upper current limit.

5. The switching power supply according to claim 4, wherein the switching control unit has a phase controller which produces both a first duty signal alternately set at a high level and a low level at a first duty ratio, and a second duty signal alternately set at a high level and a low level at a second duty ratio, the switching control unit controls the first switching unit to receive the first electric current in response to the first duty signal set at each high level, the switching control unit controls the second switching unit to receive the second electric current in response to the second duty signal set at each high level, and the switching control unit controls the phase controller, in response to the first electric current reaching the upper current limit, to reduce the duty ratios of the first and second duty signals.

6. The switching power supply according to claim 2, wherein the first switching unit has a current detecting resistor through which the first electric current flows, the second switching unit has a current limiting resistor through which the second electric current flows, a resistance of the second resistor is larger than a resistance of the first resistor, and the current detector detects the first electric current flowing through the current detecting resistor.

7. A switching power supply, comprising:
a first switching unit which receives an input voltage from an external power source and performs a first switching operation to intermittently receive a first electric current from the external power source and to produce a first voltage, different from the input voltage, from the input voltage and the first electric current;
a second switching unit which receives the input voltage from the external power source and performs a second switching operation to intermittently receive a second electric current from the external power source and to produce a second voltage, different from the input voltage, from the input voltage and the second electric current;
an output terminal which receives the first voltage of the first switching unit and the second voltage of the second switching unit and through which an output voltage obtained by combining the first and second voltages is outputted, wherein a maximum value of the first electric current is higher than a maximum value of the second electric current; and
a control unit which detects the first electric current without detecting the second electric current, controls the first switching unit to receive the first electric current during a first on-state period, controls the second switching unit to receive the second electric current during a second on-state period, shortens the first and second on-state periods in response to the first electric current reaching a current reducing limit, measures a continuation time of the first electric current which reaches the current reducing limit regardless of the shortening of the first and second on-state periods, and sets the first and second on-state periods at a zero value together, in response to the continuation time reaching a time upper limit, to stop the first and second switching operations of the first and second switching units.

8. The switching power supply according to claim 7, wherein the control unit has a phase controller which produces both a first duty signal alternately set at a high level and a low level at a first duty ratio, and a second duty signal alternately set at a high level and a low level at a second duty ratio, the control unit controls the first switching unit to receive the first electric current in response to the first duty signal set at each high level, the control unit controls the second switching unit to receive the second electric current in response to the second duty signal set at each high level, the control unit controls the phase controller, in response to the first electric current reaching the current reducing limit, to shorten the duty ratio of each of the first and second duty signals, and the control unit controls the phase controller, in response to the continuation time reaching a time upper limit, to set the duty ratio of each of the first and second duty signals to zero together.

9. A switchin power supply, comprising:
a first switching unit which receives an input voltage from an external power source and performs a first switching operation to intermittently receive a first electric current from the external power source and to produce a first voltage, different from the input voltage, from the input voltage and the first electric current;
a second switching unit which receives the input voltage from the external power source and performs a second switching operation to intermittently receive a second electric current from the external power source and to produce a second voltage, different from the input voltage, from the input voltage and the second electric current;
an output terminal which receives the first voltage of the first switching unit and the second voltage of the second switching unit and through which an output voltage obtained by combining the first and second voltages is outputted, wherein a maximum value of the first electric current is higher than a maximum value of the second electric current; and
a control unit which produces both a first duty signal alternately set at high and low levels at a first duty ratio and a second duty signal alternately set at high and low levels at a second duty ratio so as to set the first duty ratio higher than the second duty ratio, controls the first switching unit to receive the first electric current in response to the first duty signal set at each high level, and controls the second switching unit to receive the second electric current in response to the second duty signal set at each high level;
wherein the control unit comprises:
a current detector which detects the first electric current without detecting the second electric current; and
a switching control unit which reduces the duty ratios of the first and second duty signals in response to the first electric current reaching an upper current limit to prevent any of the first and second electric currents from exceeding the upper current limit.

10. The switching power supply according to claim 9, wherein the control unit sets the duty ratios of the first and second duty signals at a zero value together, in response to the first electric current reaching the upper current limit, to stop the first and second switching operations of the first and second switching units.

11. The switching power supply according to claim 9, wherein
the switching control unit sets the second duty ratio of the second duty signal at a zero value, in response to the maximum value of the first electric current decreased to a first current limit, to stop the second switching operation of the second switching unit and resets the second duty ratio set at the zero value to a first value higher than the zero value and lower than a second value of the first duty ratio of the first duty signal, in response to the maximum value of the first electric current increased to a second current limit higher than the first current limit, to again operate the second switching operation of the second switching unit.

12. A switching power supply, comprising:
a first switching unit which receives an input voltage from an external power source and performs a first switching operation to intermittently receive a first electric current from the external power source and to produce a first voltage, different from the input voltage, from the input voltage and the first electric current;
a second switching unit which receives the input voltage from the external power source and performs a second switching operation to intermittently receive a second electric current from the external power source and to produce a second voltage, different from the input voltage, from the input voltage and the second electric current;
an output terminal which receives the first voltage of the first switching unit and the second voltage of the second switching unit and through which an output voltage obtained by combining the first and second voltages is outputted, wherein a maximum value of the first electric current is higher than a maximum value of the second electric current; and
a control unit which detects the first electric current without detecting the second electric current, produces both a first duty signal alternately set at high and low levels at a first duty ratio and a second duty signal alternately set at high and low levels at a second duty ratio so as to set the first duty ratio higher than the second duty ratio, controls the first switching unit to receive the first electric current in response to the first duty signal set at each high level, controls the second switching unit to receive the second electric current in response to the second duty signal set at each high level, shortens the duty ratios of the first and second duty signals in response to the first electric current reaching a current reducing limit, measures a continuation time of the first electric current which reaches the current reducing limit regardless of the shortening of the duty ratios, and sets the duty ratios of the first and second duty signals at a zero value together, in response to the continuation time reaching a time upper limit, to stop the first and second switching operations of the first and second switching units.

\* \* \* \* \*